United States Patent [19]
Guillot et al.

[11] Patent Number: 5,793,037
[45] Date of Patent: Aug. 11, 1998

[54] PHOTOELECTRIC DETECTOR WITH BEAM REFLECTION

[75] Inventors: Alain Guillot, Fleac; Jacques Maurin, deceased, late of Cognac, by Stéphane Maurin, executor; Karine Maurin, executrix, Gensac-La-Pallue, all of France

[73] Assignee: Schneider Electric SA, Boulogne Billancourt, France

[21] Appl. No.: 800,100

[22] Filed: Feb. 13, 1997

[30] Foreign Application Priority Data

Feb. 13, 1996 [FR] France ................. 96 01908

[51] Int. Cl.$^6$ ......................... G01V 9/04
[52] U.S. Cl. ...................... 250/239; 250/221
[58] Field of Search ............... 250/221, 239, 250/222.1, 216; 340/555–557

[56] References Cited

U.S. PATENT DOCUMENTS

| | | | |
|---|---|---|---|
| 3,341,711 | 9/1967 | Shepard | 250/239 |
| 3,398,290 | 8/1968 | Basehore et al. | 250/239 |
| 3,645,634 | 2/1972 | Bucher | 250/239 |
| 3,740,562 | 6/1973 | Fertig | 250/221 |
| 5,115,129 | 5/1992 | Johnson | |
| 5,254,855 | 10/1993 | Mathivat et al. | 250/216 |

FOREIGN PATENT DOCUMENTS

| | | |
|---|---|---|
| 0 151 556 | 8/1985 | European Pat. Off. |
| 2 581 768 | 11/1986 | France |

OTHER PUBLICATIONS

W. B. Archey, et al, "Low Loss Optical Coupler", IBM Technical Disclosure Bulletin, vol. 22, No. 12, May 1980, pp. 5288–5290.

Patent Abstracts of Japan, vol. 18, No. 253, Oct. 2, 1994, p. 1.

*Primary Examiner*—Stephone B. Allen
*Attorney, Agent, or Firm*—Oblon, Spivak, McClelland, Maier & Neustadt, P.C.

[57] ABSTRACT

Photoelectric detector fitted with an optical unit having lenses focused along optical axes of transmitting and receiving components 15, 16 and with an electronic circuit 14 on one edge of which are fixed the components. A reflection head 30 is fixed in sealed manner to body 10 of the detector, said head comprising a prism preferably with total reflection 32 inserted into hood 31 with an air space maintained between reflection surface 32a of the prism and front surface 31a of the hood.

5 Claims, 1 Drawing Sheet

PHOTOELECTRIC DETECTOR WITH BEAM REFLECTION

This invention relates to a photoelectric detector comprising an optical unit, in which are placed a transmitting optical component and a receiving optical component, which is fitted at the front with a front wall provided with lenses focused upon the optical axes of the beams transmitted and received by the components.

Detectors of this type are well known having an electronic circuit, on one edge of which the components are fixed, which permits supply to the transmitting component and processing of the signal received by the receiving component, and having a body which houses the optical unit and the electronic circuit; in certain detectors a perpendicular reflection is required of the optical beams transmitted and received, and for this purpose a device which reflects the optical beams transmitted and received is provided at the front of the detector body.

The disadvantage of the such detectors with angle reflection is that their reflection device comprises firstly a mirror and is therefore complicated to assemble; also, the space required by the reflection device is generally such that it does not allow the fixation screw fixing the body to a holder to be mounted at the front of the body.

The purpose of the invention is to simplify the embodiment and assembly of a photoelectric detector of the type described.

According to the invention, the detector comprises a head fixed permanently and in sealed manner to the body, said head comprising firstly a hood that is at least partly transparent fixed to the body of the detector, and secondly a prism with an inclined reflection surface inserted into the hood such that it is sealed leaving an air space between its inclined surface and a front surface of the hood.

The prism is preferably of full reflection type, and when the detector body is threaded on the outside the hood preferably has a straight section that is no greater than that of the detector body so that a body fixation screw can be easily passed through the front of the body.

Advantageously the prism and the hood also have opposite plane surfaces to allow indexing for assembly.

The description given below of a non-restrictive example of embodiment of the invention explains, with reference to the appended drawings, the advantages and results obtained.

Figure 1:
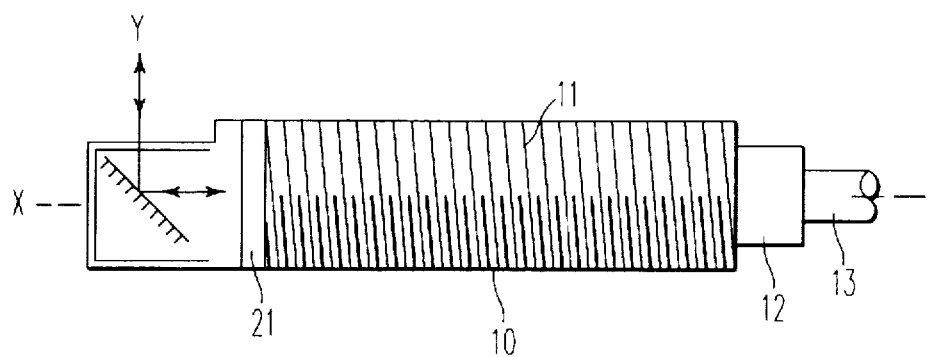
FIG. 1 is a side view of a photoelectric detector of the invention.
Figure 2:
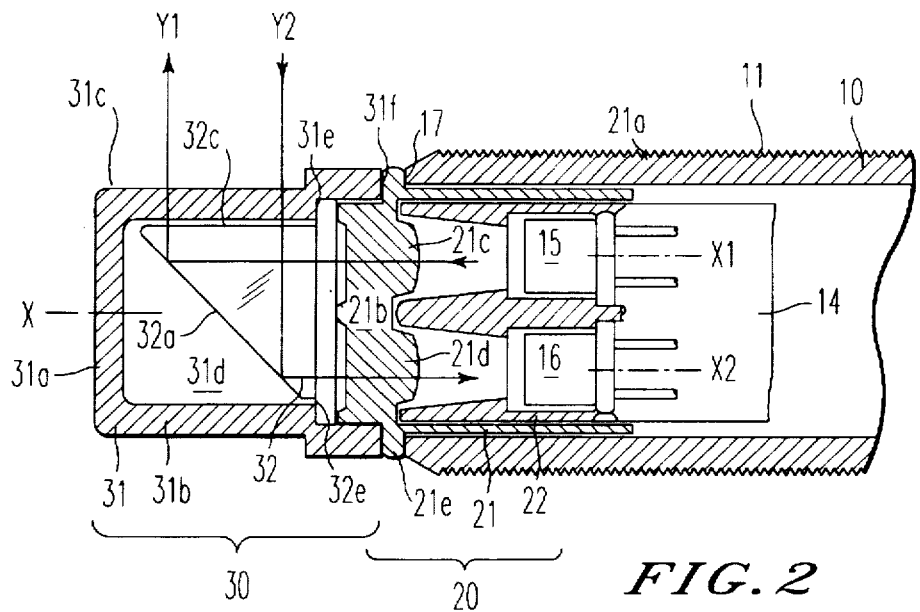
FIG. 2 is a larger scale section view of the front part of the detector of FIG. 1.
Figure 3:
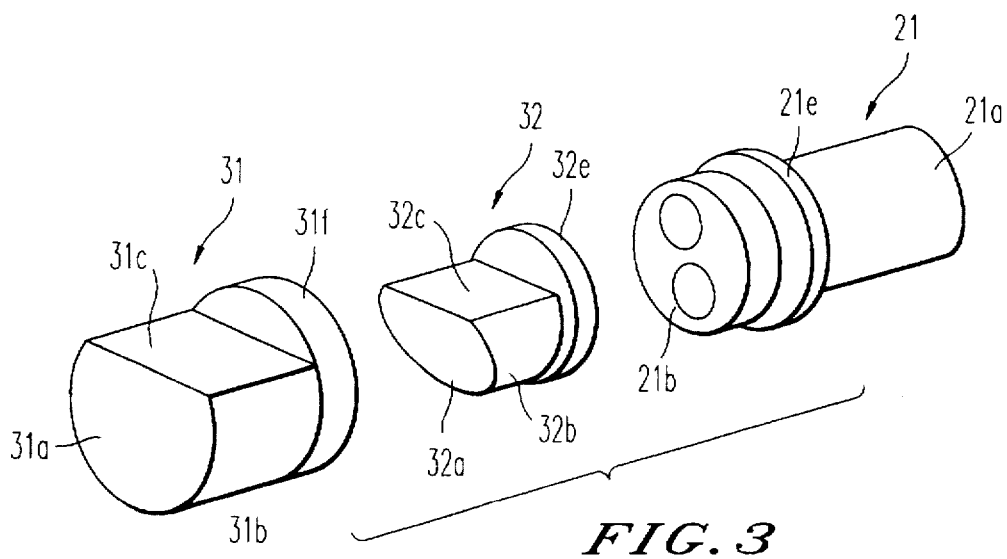
FIG. 3 is a fragmented perspective view of this front part.

The photoelectric detector illustrated in the figures comprises a cylindrical body 10 in plastic or metal material threaded on the outside at 11 for mounting into a screw-tapped holder. Body 10 is closed at the front by a transparent optical part 21 (see FIG. 2) and at the rear by a stopper 12 through which a connection cable 13 can be passed. The inner space of body 10 houses an electronic circuit, in the form of a printed circuit 14, connected at the rear to cable 13 and in the front to two optical components, namely a transmitting optical component 15 and a receiving optical component 16, transmitting and receiving optical axes X1 and X2, parallel to or substantially parallel to a direction X which itself corresponds to the longitudinal axis of the body.

At the front of the body is an optical unit 20 which comprises optical part 21 housing a sealed assembly support 22 for optical components 15, 16 and a reflection head 30 permanently fixed to the body consisting of a hood 31 and a prism 32 housed in said hood. Optical part 21 is of general closed tubular shape and comprises a tubular wall 21a, surrounding the support, which is inserted into body 10, and a front wall 21b fitted with two lenses 21c, 21d focused along optical axes X1, X2 of the transmitted and received beams. Optical part 21 has an outer flange 21e to which are respectively applied at the rear an anterior edge 17 of body 10, and at the front a posterior edge 31f of hood 31 of reflection device 30.

Hood 31 is closed at the front by a wall 31a that is substantially flat and has a general cylindrical shape in relation to wall 31b, the latter having however a transparent plane part 31c. Hood 31 has an inner space 31d filled with air and a space occupied by full reflection prism 32 ; the latter comprises a flat surface 32a oriented at 45° in relation to direction X and a cylindrical side surface 32b which fits easily against wall 31b and has a flat plane 32c which co-operates with flat plane 31c. Flat planes 31c, 32c have both an optical role and a mechanical indexing function; a polarising filter may be placed between them. Prism 32 finally has a collar applied against an abutment 31e provided at the back of the hood, recessed into the latter, while an anterior edge of optical part 21 is applied against the rear surface of collar 32e. Prism 32 is preferably of total reflection type, so that it reflects the beam transmitted by axis X1 along an orthogonal axis Y1 and so that it similarly reflects the return beam from axis Y2 along orthogonal axis X2. As a variant, reflective surface treatment may be given to surface 32A.

The described detector is assembled in the following manner. Support 22 slides inside optical unit 21 and optical components 15, 16 inserted in their support housings, then optical unit 20 is fixed to printed circuit 14 by welding the components to the latter. Prism 32 is inserted inside the hood until collar 32e is checked by abutment 31e, then the sub-unit consisting of hood 31 and prism 32 fitted therein is inserted onto optical unit 20 with the posterior edge of the hood abutting against flange 21e. The connection between parts 31, 32 and 21 is sealed by ultrasound welding. Optical unit 20, on which are thus assembled printed circuit 14 and reflection device 30, is subsequently inserted into body 10 of the detector and is made integral with the latter when hardening resin is cast in the inner space of the body.

We claim:

1. Photoelectric detector comprising
    an optical unit (20), in which are placed a transmitting optical component (15) and a receiving optical component (16) which is fitted at the front with a front wall fitted with lenses focused along optical axes (X1, X2) of the beams transmitted and received by the components,
    an electronic circuit on one edge of which are fixed the components,
    a body (10) housing the optical unit and the electronic circuit,
    a device (30) for reflecting the optical beams transmitted and received along a direction (Y) perpendicular to above-mentioned optical axes, characterized in that it comprises a head (31,32) fixed in permanent, sealed manner to body (10), said head comprising:
    a hood (31) at least partly transparent fixed to body (10) of the detector,
    a prism (32) with an inclined reflection surface (32a) inserted and fixed in sealed manner in the hood, with an air space (31d) subsisting between its inclined surface (32a) and a front surface (31a) of the hood.

2. Detector in accordance with claim 1, characterized by that the fact that prism (32) comprises a plane (32c) situated opposite a transparent plane surface (31c) of hood (31).

3. Detector in accordance with claim 1, characterized by the fact that prism (32) comprises a collar (32e) gripped between an abutment (31e) of hood (31) and a front surface (21b) of an optical part (21) belonging to optical unit (20) and fitted with lenses.

4. Detector in accordance with claim 3 characterized by the fact that hood (31) is fixed to a front flange (21e) of optical part (21) and to collar (32e) of prism (32).

5. Detector in accordance with claim 1, characterized by the fact that body (10) is threaded on the outside and that hood (31) has a straight section that is no greater than that of the body.

* * * * *